3,463,790
1,6-DIAMINO-2,3:4,5-DI-O-BENZYLIDINE-1,6-DIDEOXYGALACTITOL

William A. Black, Falkirk, Eric T. Dewar, Dalkeith, and David Rutherford, Edinburgh, Scotland, assignors to United States of America as represented by the Secretary of Agriculture
No Drawing. Application Sept. 20, 1962, Ser. No. 225,168, now Patent No. 3,225,012, dated Dec. 21, 1965, which is a continuation-in-part of application Ser. No. 140,618, Sept. 25, 1961. Divided and this application June 16, 1965, Ser. No. 527,995
Int. Cl. C07d 13/04
U.S. Cl. 260—340.9     1 Claim

ABSTRACT OF THE DISCLOSURE 1,6 - diamino - 2,3:4,5 - di-O-benzilidine-1,6-dideoxygalactitol is reacted with sebacoyl dichloride to produce the corresponding nylon-type polyamide containing a carbohydrate residue. Also disclosed are other polyamides which contain carbohydrate residues. These polyamides have the advantages of not darkening substantially during polymerization and do not develop brittleness that prevent cold drawing of fibers. Some of the polyamides are optically active, rendering them useful as light filters.

---

A non-exclusive, irrevocable, royalty-free license in the invention herein described, throughout the world for all purposes of the United States Government, with the power to grant sublicenses for such purposes, is hereby granted to the Government of the United States of America.

This application is a division of Ser. No. 225,168, filed Sept. 20, 1962, now U.S. Patent No. 3,225,012, which was a continuation-in-part of Ser. No. 140,618, filed Sept. 25, 1961, now abandoned.

This invention relates to the practical preparation of nylon-type polyamides containing carbohydrate residues, which carbohydrate-containing polyamide polymers are not subject to the prior art handicaps of substantial darkening of the product during polymerization and do not develop the excessive brittleness that prevents the "cold drawing" of fibers thereof.

Although the general polymerization of glucose and other carbohydrates with acidic catalysts has been extensively studied, only a few specific carbohydrate monomers containing functional groups capable of polymerization in a given direction to give polymers of particular interest have been prepared.

Haworth et al., Jour. Chem. Soc., 155 (1944) attempted to prepare polyamide fibers by condensing 1,6-diamino - 1,6 - dideoxy-2,4:3,5-di-O-methylene-D-mannitol at 210° to 250° C. with a dibasic acid such as oxalic, adipic, sebacic, and di-O-methylene-L-idaric acid, but the condensation products were darkly colored, and the fibers drawn from the melt were brittle and could not be "cold drawn." Hamamura et al., Jour. Agr. Chem. Soc., Japan, 18, 1092 (1942) unsuccessfully tried to prepare polyamides with 1,6-diaminodimethylenemannitol. Wiggins, Jour. Chem. Soc., 384 (1946) reacted 1,2:5,6-dianhydro-3,4-O-isopropylidene-D-mannitol at 150° to 160° C. with 1,6 - diaminodimethylenemannitol, but the resin which formed was of little interest because of its insolubility. Wolfrom et al., Jour. Amer. Chem. Soc., 80, 6328 (1958) prepared hydroxy-polyamides by condensing tetra-O-acetylgalactaroyl dichloride with ethylenediamine or piperazine but the acetylated polyamides were insoluble in common organic solvents and decomposed above 250° without melting. Butler et al., British Patent 750,822 have formed linear polyamides by condensing a diamine at high temperature with di-O-methylene-, di-O-ethylidene- and di-O-isopropylidene-galactaric acid.

A principal object of our invention is the preparation of nylon-type polyamides. Another object is the preparation of 1,6-diamino-1,6-dideoxy-2,4:3,5-di-O-methylene-D - glucitol dihydrochloride, 1,6 - diamino-1,6-dideoxy-2,4:3,5-di-O-methylene-L-iditol and its dihydrochloride, 1,6 - diamino - di - O - benzylidene-1,6-dideoxygalactitol, and 1,6 - diamino - 1,6-dideoxy-di-O-isopropylidenegalactitol, which novel compounds are essential intermediates in the formation of high-viscosity, nylon-type polyamides. A further object is the preparation of 2,4:3,5-di-O-methylene - D - glucaroyl dichloride and 2,4:3,5-di-O-methylene-L-idaroyl dichloride, these compounds also being essential intermediates in the formation of high-viscosity nylon-type polyamides. Still another object is an improved method of forming the above nylon-type polyamides that avoids any injurious or destructive thermal effects on the formed polyamide. The above and related objects will become fully apparent from a reading of the examples and appended claims.

In the instant invention we have prepared synthetic linear high-viscosity carbohydrate polyamides by the interfacial polycondensation of a substituted diamino-dideoxy sugar alcohol derived from hexose sugar alcohols such as D-mannitol, D-glucitol (sorbitol), L-iditol, or galactitol (dulcitol) and a dibasic acid chloride, e.g., sebacoyl, adipoyl or terephthaloyl chloride, or by a similar polycondensation of a substituted sugar dicarboxylic acid chloride, such as hexaroyl dichloride derived from a sugar acid such as D-glucaric (saccharic) acid, L-idaric acid, or galactaric (mucic) acid, with either any ordinary diamine such as hexamethylenediamine or decamethylenediamine, or with one of the above substituted diamino-dideoxy sugar alcohols.

Representative of the substituted diamino-dideoxy sugar alcohols which are operative in preparing the improved and useful nylon-type polyamides of our invention are:

1,6-diamino-1,6-dideoxy-2,4:3,5-di-O-methylene-D-mannitol
1,6-diamino-1,6-dideoxy-2,4:3,5-di-O-methylene-D-glucitol
1,6-diamino-1,6-dideoxy-2,4:3,5-di-O-methylene-L-iditol
1,6-diamino-1,6-dideoxy-2,4:3,5-di-O-methylene-galactitol
1,6-diamino-2,3:4,5-di-O-benzylidene-1,6-dideoxy-galactitol
1,6-diamino-1,6-dideoxy-di-O-isopropylidene-galactitol.

Similarly, representative carbohydrate-derived diacid chlorides include:

Di-O-methylene-D-glucaroyl dichloride
Di-O-methylene-L-idaroyl dichloride
Di-O-methylenegalactaroyl dichloride
Tetra-O-acetylgalactaroyl dichloride.

The selected diamine or its dihydrochloride is dissolved in water containing the required amount of alkali and reacted with the diacid chloride in a water-immiscible solvent as taught by Magat et al., U.S. 2,708,617 and 2,831,834.

Where the hydroxyl-protecting groups in the substituted diamino-dideoxy sugar alcohol are methylene residues, as in 1,6-diamino-1,6-dideoxy-2,4:3,5-di-O-methylene-D-mannitol,
1,6-diamino-1,6-dideoxy-2,4:3,5-di-O-methylene-D-glucitol, 1,6-diamino-1,6-dideoxy-2,4:3,5-di-O-methylene-L-iditol, and
1,6-diamino-1,6-dideoxy-2,4:3,5-di-O-methylene-galactitol, these methylene residues cannot be removed after the polycondensation without decomposing the polymer, but where the protecting groups are isopropylidine residues, as in 1,6 - diamino - 1,6 - dideoxy-2,3:4,5-di-O-isopropylidenegalactixol whose preparation is a principal object of this invention, these can be removed after polycondensation by mild acid treatment to give a linear, insoluble, infusible, tetrahydroxy-nylon, which has exceptional commercial promise.

The diamines synthesized from D-mannitol, D-glucitol, and L-iditol, and the substituted D-glucaroyl and L-idaroyl dichlorides, all give rise to optically active polyamides which may have special utility as light-filter components.

EXAMPLE 1

Poly(1,6-dideoxy-2,4:3,5-di-O-methylene-1-sebacamido-D-mannitol)

A solution of sebacoyl dichloride (721 mg.; 3.02 mmol.) in 50 ml. $CCl_4$ was added at 20° C. to a rapidly stirred solution of 1,6-diamino-1,6-dideoxy-2,4:3,5-di-O-methylene-D-mannitol dihydrochloride (836 mg.; 3.02 mmol.) in 0.4 N sodium hydroxide (30.2 ml.; 12.08 mmol.). The resulting polyamide was sequentially washed with 0.1 N HCl, 0.1 N sodium hydroxide, water, alcohol and ether, and dried in vacuo over $P_2O_5$ to a white, fibrous product (584 mg.). Yield, 52.2%. $[\alpha]_D^{20} +85°$ in m-cresol (c., 0.5). The inherent viscosity, $\eta_{inh.} = c.^{-1}$ ln $(\eta_{soln.}/\eta_{solv.})$, of a solution of the polymer in m-cresol was 0.08 dl./g. (c., 0.5 g./100 ml.; 25°). It melted at 165–175° C. without decomposition and was soluble in dimethylformamide, dimethylsulphoxide, m-cresol, and formic acid.

Analysis.—$(C_{18}H_{30}N_2O_6)_n$ requires N, 7.56%. Found: N, 7.40.

EXAMPLE 2

Poly(1,6-dideoxy-2,4:3,5-di-O-methylene-1-terephthalamido-D-mannitol)

A solution of pure terephthaloyl dichloride (3 mmol.) in 50 ml. $CCl_4$ was added at 0° to a rapidly stirred solution of 1,6-diamino-1,6-dideoxy-2,4:3,5-di-O-methylene-D-mannitol dihydrochloride (3 mmol.) in a 0.4 N sodium hydroxide (30 ml.; 12 mmol.). The polyterephthalamide was isolated in 78.7% yield as in Example 13. $[\alpha]_D +83°$ in m-cresol (c., 0.5). It melted at 110–230° C. without decomposition and had similar solubility characteristics to the polymer of Example 1. Its inherent viscosity was 0.65 in m-cresol.

Analysis.—$(C_{16}H_{15}N_2O_6)_n$ requires C, 57.5; H, 5.4; N, 8.4%. Found: C, 55.9; H, 5.7; N, 8.1.

EXAMPLE 3

1-diamino-1,6-dideoxy-2,4:3,5-di-O-methylene-D-glucitol dihydrochloride 1,6 - dichloro - 1,6-dideoxy-2,4:3,5-di-O-methylene-D-glucitol (6.7 g.), prepared according to the teachings of Haworth et al., Jour. Chem. Soc., 58 (1944), was heated with (31% w./v.) aqueous ammonia solution (120 ml.) at 110–115° C. for 24 hr. The solution was evaporated to dryness, the solid dissolved in water (75 ml.), and the solution passed through a column of Amberlite resin IRA–401–OH to remove chloride. The eluate was concentrated, and the crude diamine (5.07 g.) was dissolved in water (10 ml.). Concentrated hydrochloric acid (5.7 ml.) was added at 0°, and crystallization was effected by adding ethanol (20 ml.). The product was recrystallized three times from aqueous ethanol to give 1,6-diamino - 1,6 - dideoxy - 2,4:3,5-di-Omethylene-D-glucitol dihydrochloride (2.17 g.). Yield, 28.4%. $[\alpha]_D +36.8°$ in water (c., 1).

Analysis.—$C_8H_{16}N_2O_4 \cdot 2HCl$ requires C, 34.7; H, 6.54; Cl, 25.6; N, 10.1%. Found: C, 34.2; H, 6.45; Cl, 25.0; N, 9.9.

EXAMPLE 4

Poly(1,6-dideoxy-2,4:3,5-di-O-methylene-1-sebacamido-D-glucitol)

A solution of sebacoyl dichloride (3 mmol.) in 50 ml. $CCl_4$ was added at 0° to a rapidly stirred solution of the diamine dihydrochloride (3 mmol.) of Example 15 in 0.4 M sodium hydroxide (30 ml.; 12 mmol.). The polyamide was isolated in 55.9% yield as in Example 1. $[\alpha]_D -8 \pm 2°$ in m-cresol (c., 0.3). It decomposed above 270° without melting. It was insoluble in dimethylformamide, dimethylsulphoxide, and formic acid, and soluble in m-cresol. Its inherent viscosity was 1.20 in m-cresol.

Analysis.—$(C_{18}H_{30}N_2O_6)_n$ requires C, 58.4; H, 8.2; N, 7.6%. Found: C, 57.7; H, 8.2; N, 7.0.

EXAMPLE 5

1,6-diamino-1,6-dideoxy-2,4:3,5-di-O-methylene L-iditol 2,4:3,5 - di-O-methylene-L-iditol (2 g.), prepared according to Hann et al., Jour. Amer. Chem. Soc., 67, 602 (1945) was sustended in dry pyridine (17 ml.). Thionyl chloride (10 ml.) was added, and the mixture refluxed at 100° for 30 min. The product was worked up according to the method of Haworth et al., Jour. Chem. Soc., 58 (1944) for the corresponding glucitol derivative. The yellow solid (1 g.) was recrystallized from ethanol (200 ml.), and the crystals extracted with carbon disulfide to remove contaminating sulphur and give pure 1,6-dichloro-1,6-dideoxy - 2,4:3,5 - di-O-methylene-L-iditol (533 mg.) in 22.5% yield. M.P. 236.5–237°; $[\alpha]_D +64.4°$ in chloroform (c., 1.4).

Analysis.—$C_8H_{10}N_2O_4$ requires C, 47.1; H, 7.88; N, 29.2%. Found: C, 39.1; H, 5.17; Cl, 29.3%.

The 1,6 - dichloro - 1,6 - dideoxy-2,4:3,5-di-O-methylene-L-iditol (2.2 g.) was treated with 31% (w./v.) aqueous ammonia (40 ml.) at 110–115° C. for 24 hr. as described in Example 3 for the glucitol derivative, and the crude diamine (1.28 g.) sublimed at 180° C./0.05–0.1 mm. Hg to give pure 1,6-diamino-1,6-dideoxy-2,4:3,5-di-O-methylene-L-iditol (685 mg.) in 37.1% yield. M.P. 210–212° (decomp.); $[\alpha]_D +19°$ in m-cresol (c., 0.5).

Analysis.—$C_8H_{10}N_2O_4$ requires C, 47.1; H, 7.88; N, 13.7%. Found, C, 47.2; H, 7.94; N, 13.5.

EXAMPLE 6

1,6-diamino-1,6-dideoxy-2,4:3,5-di-O-methylene-L-iditol dihydrochloride

The diamine (1.213 g.) of Example 5 in water (2.5 ml.) was treated at 0° with concentrated hydrochloric acid (1.4 ml.) and ethanol (10 ml.) to give crystalline 1,6 - diamino - 1,6 - dideoxy-2,4:3,5-di-O-methylene-L-iditol dihydrochloride (832 mg.) in 50.5% yield $[\alpha]_D +13°$ in water (c., 0.5).

Analysis.—$C_8H_{16}N_2O_4 \cdot 2HCl$ requires C, 34.7; H, 6.54; Cl, 25.6; N, 10.1%. Found: C, 34.3; H, 6.60; Cl, 25.2; N, 9.8.

EXAMPLE 7

Poly(1,6-dideoxy-2,4:3,5-di-O-methylene-1-sebacamido-L-iditol)

A solution of sebacoyl dichloride (3 mmol.) in 50 ml. $CCl_4$ was added at 0° to a rapidly stirred solution of the diamine dihydrochloride (3 mmol.) of Example 6 in 0.4 N sodium hydroxide (30 ml.; 12 mmol.). The polyamide was isolated in 80.8% yield as in Example 13. $[\alpha]_D -69°$ in m-cresol (c., 0.5). It decomposed above 320° C. without melting. It was sparingly soluble in formic acid and m-cresol, and insoluble in dimethylformamide and dimethylsulphoxide. Its inherent viscosity was 0.91 in m-cresol.

*Analysis.*—$(C_{16}H_{30}N_2O_6)_n$ requires C, 58.4; H, 8.2; N, 7.6%. Found: C, 57.3; H, 8.2; N, 7.3.

EXAMPLE 8

Poly(1,6-dideoxy-2,4:3,5-di-O-methylene-1-sebacamidogalactitol)

(1) A solution of sebacoyl dichloride (770 mg.; 3.22 mmol.) in 54 ml. $CCl_4$ was added at 0° C. to a rapidly stirred solution of 1,6-diamine-1,6-dideoxy-2,4:3,5-di-O-methylenegalactitol (658 mg.; 3.22 mmol.) in 0.2 N sodium hydroxide (32.2 ml.; 6.44 mmol.). The polyamide was isolated in 68.9% yield as in Example 1. The polymer was optically inactive. It melted at 200–206° C. without decomposition and had similar solubility characteristics to the polymer of Example 1. Its inherent viscosity was 0.84 in m-cresol.

*Analysis.*—$(C_{18}H_{30}N_2O_6)_n$ requires C, 58.37; H, 8.16; N, 7.56%. Found: C, 57.9; H, 8.22; N, 7.75.

(2) A solution of sebacoyl dichloride (760 mg.; 3.18 mmol.) in 50 ml. $CCl_4$ was added at 20° C. to a rapidly stirred solution of 1,6-diamino-1,6-dideoxy-2,4:3,5-di-O-methylenegalactitol dihydrochloride (880 mg.; 3.18 mmol.) in 0.4 N NaOH (31.8 ml.; 12.72 mmol.). A polyamide having similar properties to that of Example 8(1) was obtained but with a higher inherent viscosity (0.95 in m-cresol).

*Analysis.*—$(C_{16}H_{30}N_2O_6)_n$ requires N, 7.56%. Found: N, 7.34.

EXAMPLE 9

Poly(1-adipamido-1,6-dideoxy-2,4:3,5-di-O-methylenegalactitol)

A solution of adipoyl dichloride (256 mg.; 1.40 mmol.) in 25 ml. $CCl_4$ was added at −5° C. to a rapidly stirred solution of 1,6-diamino-1,6-dideoxy-2,4:3,5-O-methylenegalactitol dihydrochloride (388 mg.; 1.40 mmol.) in 0.4 N NaOH (14 ml.; 5.6 mmol.). The polyamide (220 mg.) was isolated in 49.9 percent yield with an inherent viscosity of 0.36 in m-cresol. M.P. 226–255° C.

*Analysis.*—$(C_{14}H_{22}N_2O_6)_n$ requires N, 8.92%. Found: N, 8.27.

EXAMPLE 10

Poly(1,6-dideoxy-2,4:3,5-di-O-methylene-1-terephthalamidogalactitol)

A solution of pure terephthaloyl dichloride (3 mmol.) in 50 ml. $CCl_4$ was added at 0° to a rapidly stirred solution of 1,6-diamino-1,6-dideoxy-2,4:3,5-di-O-methylenegalactitol dihydrochloride (3 mmol.) in 0.4 N sodium hydroxide (30 ml.; 12 mmol.) to give the polyamide in 91.9% yield. It melted at 265–275° without decomposition. It was sparingly soluble in dimethylsulfoxide, formic acid, and m-cresol. Its inherent viscosity was 0.61 in m-cresol.

*Analysis.*—$(C_{16}H_{18}N_2O_6)_n$ requires C, 57.5; H, 5.4; N, 8.4%. Found: C, 56.5; H, 5.6; N, 8.0.

EXAMPLE 11

1,6-diamino-2,3:4,5-di-O-benzylidene-1,6-dideoxygalactitol

Dry hydrogen chloride gas was passed through an agitated suspension of 1,6-dichloro-1,6-dideoxygalactitol (6.056 g.), prepared according to the teachings of Butler, et al., Jour. Chem. Soc., 636 (1956), in benzaldehyde (42 ml.) for 4 hr. The solid was filtered, washed with petroleum ether and water, and recrystallized twice from ethanol (800 ml.) to give pure 2,3:4,5-di-O-benzylidene-1,6-dichloro-1,6-dideoxygalactitol (5.952 g.) in 54.5% yield. M.P. 153–4°.

*Analysis.*—$C_{20}H_{20}Cl_2O_4$ requires C, 60.8; H, 5.10; Cl, 17.9%. Found: C, 61.2; H, 5.31; Cl, 18.2.

This dibenzylidenedichlorogalactitol (1.11 g.) was heated at 145–150° C. for 72 hr. with dry methanol saturated with ammonia at 0° C. (80 ml.). The solution was concentrated, the solid dissolved in methanol (60 ml.) and water (30 ml.), and chloride removed with Amberlite resin IRA–401–OH. The eluate and washings were concentrated, and the crude diamine was distilled (bath temp. 250–280° C./0.01 mm. Hg) to give crystalline 1,6-diamino-2,3:4,5-di-O-benzylidene-1,6-dideoxygalactiol in 39.5% yield.

*Analysis.*—$C_{20}H_{24}N_2O_4$ requires N, 7.86%. Found: N, 7.89.

EXAMPLE 12

Poly-2,3:4,5-(di-O-benzylidene-1,6-dideoxy-1-sebacamidogalactitol)

A solution of the diamine (1.5 mml.) of Example 23 was dissolved in ethanol (30 ml.), and the solution titrated to pH 6 with 0.1 N hydrochloric acid (30 ml.) to give a solution containing 1.5 mmol. of the diamine dihydrochloride. The solution was concentrated in vacuo at 40° to 20 ml. to remove ethanol, cooled to 0°, a cold solution of sebacoyl dichloride (1.5 mmol.) in $CCl_4$ (50 ml.) was added and followed immediately by the addition of 0.5 N sodium hydroxide (12 ml.; 6 mmol.) and the solutions mixed for 10 min. The polyamide was isolated in 74.5% yield. It melted at 210–220° C. It was soluble in dimethylformamide, dimethylsulfoxide, formic acid and m-cresol. Its inherent viscosity was 0.41 in m-cresol.

*Analysis.*—$(C_{30}H_{38}N_2O_6)_n$ requires N, 5.36%. Found: N, 5.23.

EXAMPLE 13

1,6-diamino-1,6-dideoxy-2,3:4,5-di-O-isopropylidenegalactitol 1,6-dichloro-1,6-dideoxygalactitol (1.008 g.), prepared according to the method of Butler et al., Jour. Chem. Soc., 636 (1956) was shaken at 20° for 19 hours with dry acetone (12.5 ml.) containing 0.1 ml. sulphuric acid. Further acetone (10 ml.) was added, the solution neutralized with anhydrous $Na_2CO_3$, and the filtrate concentrated. The resulting crystalline residue (1.323 g.) was twice recrystallized from 20 ml. petroleum ether (B.P. 60–80°) to give 1,6 - dichloro-1,6-dideoxy-2,3:4,5-di-O-isopropylidenegalactitol (862 mg.) in 62.7 percent yield. M.P. 114.5–115° C. Infrared analysis showed the absence of OH absorption.

*Analysis.*—$C_{12}H_{20}Cl_2O_4$ requires C, 48.16; H, 6.74; Cl, 23.69%. Found: C, 47.7; H, 6.80; Cl, 23.77.

This 1,6 - dichloro-2,3:4,5-di-O-isopropylidene-galactitol (5 g.) was heated with 31 percent (w./v.) aqueous ammonia solution (160 ml.) at 110–115° for 4½ days with occasional shaking. The solution was concentrated to dryness, the residue dissolved in 100 ml. water, and the solution passed through a column (175 ml.) of Amberlite resin IRA–401–OH to remove chloride. The eluate was concentrated in the absence of carbon dioxide and the product distilled to give crystalline 1,6 - diamino - 1,6 - dideoxy-2,3:4,5-di-O-isopropylidenegalactitol (2.536 g.) in 58.3% yield. B.P. 96–98° C./0.05 mm. Hg; M.P. 69–71° C.

*Analysis.*—$C_{12}H_{24}N_2O_4$ requires C, 55.37; H, 9.29; N, 10.76%. Found: C, 54.8; H, 9.05; N, 11.02.

EXAMPLE 14

Poly(1,6-dideoxy-2,3:4,5-di-O-isopropylidene-1-sebacamidogalactitol)

A solution of sebacoyl dichloride (3.467 g.; 14.5 mmol.) in 230 ml. $CCl_4$ at 0° was added to a cold solution of the 1,6-diamino-1,6-dideoxy-2,3:4,5-di-O-isopropylidene gelactitol (3.775 g.; 14.5 mmol.) of Example 25 in 0.2 N sodium hydroxide (145 ml.; 29 mmol.), and the solutions were mixed in a macerator for 5 min. The polymer was washed with 0.01 N hydrochloric acid, 0.1 N sodium hydroxide and water. The crude product was extracted with boiling ethanol (115 ml.), and the extract poured into dilute sodium chloride solution (2 l.). The precipitate was washed with water to give the polyamide as a white, fibrous product (3.903 g.). Yield, 63.1%. It melted at 125–135°. It was soluble in ethanol, chloroform, dimethylformamide, dimethylsulfoxide, formic acid, and m-cresol. Its inherent viscosity was 0.94 in m-cresol.

*Analysis.*—$(C_{22}H_{38}N_2O_6)_n$ requires C, 61.9; H, 9.0; N, 6.6%. Found: C, 61.3; H, 8.9; N, 6.35.

The molten polyamide yielded filaments.

EXAMPLE 15

Poly(1,6-didoxy-1-sebacamidogalactitol), i.e. tetrahydroxy-nylon

The acetonated polyamide (508 mg.) of Example 26 was deacetonated by heating at 100° C. in a sealed tube for 2 hours with 0.1 N methanolic HCl (30 ml.) containing water (1.5 ml.). The tetrahydroxy-nylon which precipitated was washed with water and dried to a powder (329 mg.; 79.7% yield). This hydroxy-polyamide was infusible and insoluble in the usual polyamide solvents with the exception of formic acid. The inherent viscosity was 0.36 in formic acid.

EXAMPLE 16

2,4:3,5-di-O-methylene-D-glucaroyl dichloride

Finely powdered, anhydrous di-O-methylene-D-glucaric acid (5 g.), prepared according to the method of Haworth, et al., Jour. Chem. Soc., 61 (1944), was refluxed for 6 hr. with thionyl chloride (25 ml.), excess thionyl chloride removed in vacuo, the crude acid chloride refluxed with dry carbon tetrachloride (300 ml.), and the insoluble material filtered. On concentration the filtrate gave crystals, which were washed with light petroleum ether to give 2,4:3,5-di-O-methylene - D - glucaroyl dichloride (4.90 g.). Yield 84.6%. M.P. 70°; $[\alpha]_D+73.5°$ in benzene, $+66.5°$ in m-cresol (c., 1).

*Analysis.*—$C_8H_8Cl_2O_6$ requires C, 35.4; H, 2.97; Cl, 26.15%. Found: C, 35.7; H, 3.08; Cl, 26.1.

EXAMPLE 17

Poly(hexamethylene-2,4:3,5-di-O-methylene-D-glucaramide)

A solution of the diacid chloride (3 mmol.) of Example 16 in 75 ml. $CCl_4$ was added at 0° to a rapidly stirred solution of hexamethylenediamine (3 mmol.) in 0.2 N NaOH (30 ml.; 6 mmol.). The crude product was purified by dissolving in 25 ml. dimethylformamide and pouring the filtered solution into saturated NaCl solution (100 ml.). The precipitate was washed thoroughly with water to give a tough, rubbery polyamide in 68.2% yield. $[\alpha]_D+56°$ in m-cresol (c., 0.5). It decomopsed above 270° without melting. It was soluble in chloroform, dimethylformamide, dimethylsulfoxide, formic acid and m-cresol. Its inherent viscosity was 1.08 in m-cresol.

*Analysis.*—$(C_{14}H_{22}N_2O_6)_n$ requires C, 53.5; H, 7.1; N, 8.9%. Found: C, 51.6; H, 7.2; N, 8.4.

EXAMPLE 18

2,4:3,5-di-O-methylene-L-idaroyl dichloride

Finely powdered, pure di-O-methylene - L - idaric acid (5.01 g.), prepared in accordance with Haworth et al., Jour. Chem. Soc., 61 (1944), was refluxed with pure thionyl chloride (100 ml.) for 5 hr., the mixture cooled, dimethoxyethane (100 ml.) added with cooling, and refluxing continued until the acid dissolved. The hot solution was filtered, and the filtrate cooled to 0° to give crystalline 2,4:3,5-di-O-methylene - L - idaroyl dichloride (4.49 g.). Yield, 77.5%. M.P. 217–220° C.; $[\alpha]_D+135°$ in benzene (c., 0.2), $+143°$ in m-cresol (c., 0.5).

*Analysis.*—$C_8H_8Cl_2O_6$ requires C, 35.4; H, 2.97; Cl, 26.15%. Found: C, 35.5; H, 3.31; Cl, 26.0.

EXAMPLE 19

Poly(hexamethylene-2,4:3,5-di-O-methylene-L-idaramide)

A solution of the diacid chloride (4.352 g.; 16.05 mmol.) of Example 18 in 400 ml. methylene chloride was added at 20° C. to a solution of hexamethylenediamine (1.865 g.; 16.05 mmol.) in 0.2 N NaOH (160 ml.; 32 mmol.) and the solutions mixed in a high-speed macerator. The polyamide (2.821 g.; 55.9% yield) was obtained as a white fluffy, fibrous material with a very high specific rotation ($[\alpha]_D^{19}+284°$ in m-cresol; c., 0.5). The polymer did not melt below 320° C. Its inherent viscosity was 0.95 in m-cresol.

*Analysis.*—$(C_{14}H_{22}N_2O_6)_n$ requires C, 53.5; H, 7.1; N, 8.9%. Found: C, 52.8; H, 7.2; N, 8.7.

EXAMPLE 20

Poly(decamethylene-2,4:3,5-di-O-methylene-L-idaramide)

A solution of the diacid chloride of Example 18 in methylene chloride was added to a solution of decamethylenediamine in 0.2 N NaOH as described in Example 19 to give a polyamide in 48.6% yield having an inherent viscosity of 0.73 in m-cresol. $[\alpha]_D+238°$ in m-cresol (c., 0.5). The polyamide decomposed above 320° C. without melting.

*Analysis.*—$(C_{18}H_{30}N_2O_6)_n$ requires C, 58.4; H, 8.2; N, 7.6%. Found: C, 57.7; H, 8.2; M, 7.3.

EXAMPLE 21

Poly(hexamethylene-2,4:3,5-di-O-methylenegalactaramide)

2,4:3,5-di-O-methylenegalactaroyl dichloride (19 g.; 70.1 mmol.) in 1170 ml. $CCl_4$ was added to a solution of hexamethylenediamine (8.143 g.; 70.1 mmol.) in 0.5 N NaOH (280 ml.; 140 mmol.) and the solutions mixed in a high-speed macerator. The polyamide (17.05 g.; 77.4% yield) was obtained as a white product, which melted at 200–210° C. to a viscous liquid. Its inherent viscosity was 0.97 in m-cresol.

*Analysis.*—$(C_{14}H_{22}N_2O_6)_n$ requires C, 53.5; H, 7.1; N, 8.9%. Found: C, 53.3; H, 7.2; N, 8.75.

EXAMPLE 22

Poly(hexamethylene-2,3:4,5-tetra-O-acetylgalactaramide)

A solution of 2,3:4,5-tetra-O-acetylgalactaroyl dichloride (631 mg.; 1.52 mmol.) in 25 ml. $CCl_4$ was added at 20° C. to a rapidly stirred solution of hexamethylenediamine (176 mg.; 1.52 mmol.) in 0.2 N NaOH (15.2 ml.; 3.04 mmol.). The polyamide (279 mg.; 39.9% yield) was obtained as a white, free-flowing powder with an inherent viscosity in m-cresol of 0.34. The polymer, which is tetraacetoxy-nylon, was optically inactive.

*Analysis.*—$(C_{20}H_{30}N_2O_{10})_n$ requires C, 52.4; H, 6.60; N, 6.1%. Found: C, 52.3; H, 6.77; N, 6.2.

EXAMPLE 23

Poly[1,6-dideoxy-2,4:3,5-di-O-methylene-1-(2,4:3,5-di-O-methylenegalactaramido)-galactitol]

A solution of di-O-methylenegalactaroyl dichloride (3 mmol.) in 50 ml. $CCl_4$ was added at 0° to a rapidly stirred solution of 1,6-diamino-1,6-dideoxy-2,4:3,5-di-O-methylene-galactitol dihydrochloride (3 mmol.) in 0.4 N NaOH (30 ml.; 12 mmol.). The polyamide was obtained as a white powder in 24.1% yield having an inherent viscosity of 0.39 in m-cresol. The polymer was optically inactive.

*Analysis.*—$(C_{16}H_{22}N_2O_{10})_n$ requires C, 47.8; H, 5.5; N, 7.0%. Found: C, 47.4; H, 5.7; N, 6.6.

We claim:
1. 1,6 - diamino - 2,3:4,5-di-O-benzylidene-1,6-dideoxy-galactitol.

(References on following page)

References Cited

Bragg et al.: "Can. Journ. of Chem.," vol. 37, 1959, pp. 1412–16, QD1C2.

Butler et al.: "Chem. Soc. Journ." (London), 1956, pp. 636–40, QD1C6.

Morgan et al.: "Journ. Amer. Chem. Soc.," vol. 78, 1956, pp. 2496–97, QD1A5.

NICHOLAS S. RIZZO, Primary Examiner

JAMES H. TURNIPSEED, Assistant Examiner

U.S. Cl. X.R.

88—311; 252—300; 260—29.6, 31.2, 32.6, 32.8, 33.4, 33.6, 33.8, 77.5, 78, 78.4, 88.3, 89.5, 91.1, 210, 211, 234, 340.7, 488